United States Patent
Steplyk et al.

(10) Patent No.: US 10,171,687 B2
(45) Date of Patent: Jan. 1, 2019

(54) PROVIDING CONTENT AND ATTACHMENT PRINTING FOR COMMUNICATION

(71) Applicant: MICROSOFT TECHNOLOGY LICENSING, LLC, Redmond, WA (US)

(72) Inventors: Hayley L. Steplyk, Cambridge, MA (US); Joseph P. Masterson, Bellevue, WA (US); Eungsoo Kim, Redmond, WA (US); Shahil Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/337,183

(22) Filed: Oct. 28, 2016

(65) Prior Publication Data

US 2018/0124260 A1    May 3, 2018

(51) Int. Cl.
    *H04N 1/00*    (2006.01)
(52) U.S. Cl.
    CPC ..... *H04N 1/00233* (2013.01); *H04N 1/00411* (2013.01); *H04N 1/00413* (2013.01); *H04N 1/00461* (2013.01)
(58) Field of Classification Search
    None
    See application file for complete search history.

(56) References Cited

U.S. PATENT DOCUMENTS

| | | |
|---|---|---|
| 7,458,038 B2 | 11/2008 | Rimas-Ribikauskas et al. |
| 8,037,146 B2 | 10/2011 | Carr et al. |
| 8,185,591 B1 * | 5/2012 | Lewis ............. G06Q 10/107 358/1.15 |
| 8,938,690 B1 | 1/2015 | Khouri et al. |
| 2012/0038944 A1 * | 2/2012 | Jarvis ............... G06F 3/1204 358/1.15 |

(Continued)

OTHER PUBLICATIONS

"Print attachments received in email messages", Retrieved on: Aug. 31, 2016 Available at: https://support.office.com/en-us/article/Print-attachments-received-in-email-messages-30fb682d-d311-4a17-ba5e-8409ca6f776e.

(Continued)

*Primary Examiner* — Lennin Rodriguezgonzalez
(74) *Attorney, Agent, or Firm* — Michael Best & Friedrich LLP

(57) ABSTRACT

Variety of approaches to provide content and attachment printing for a communication are described. A productivity application initiates operations to provide content and attachment printing for a communication upon detecting an intent of a recipient to execute a print operation associated with the communication. Next, a content of the communication or attachment(s) associated with the communication is identified. A print menu is also provided. The print menu includes options for the print operation while displaying the content and representations of the attachment(s) together. In response to detecting a hover action on the print menu, an option for the print operation is highlighted. The option is associated with the content of the communication and/or attachment(s) associated with the communication. Upon receiving a selection of the option for the print operation, the print operation is performed without downloading the attachment(s) to a local storage.

15 Claims, 8 Drawing Sheets

(56) References Cited

U.S. PATENT DOCUMENTS

2013/0318181 A1    11/2013  Nakajo et al.
2014/0281969 A1*  9/2014  Kumar ................. G06F 3/0482
                                                      715/711
2014/0293320 A1    10/2014  Williams et al.
2015/0271118 A1     9/2015  Nudel et al.
2015/0277711 A1*  10/2015  Masterson .......... G06F 3/04842
                                                      715/752

OTHER PUBLICATIONS

"Print on Demand", Published on: Jul. 6, 2015 Available at: https://www.sperrysoftware.com/Email-Tools/product/print-on-demand/.

"Print Tools for Outlook", Retrieved on: Aug. 31, 2016 Available at: https://www.mapilab.com/outlook/print_tools/.

"Are you looking to overcome the limitations of Outlook printing?", Published on: Sep. 14, 2008 Available at: http://www.savvisoft.com/.

"OutlookPrinter—Print Outlook E-mails", Retrieved on: Aug. 31, 2016 Available at: http://www.outlookprinter.com/.

* cited by examiner

PROVIDING CONTENT AND ATTACHMENT PRINTING FOR COMMUNICATION

BACKGROUND

Information exchange through a variety of communication modalities has changed processes associated with work and personal environments. Automation and process enhancements have expanded scope of capabilities offered for information consumption in personal and business scenarios. With the development of faster and smaller electronics, execution of mass processes at cloud systems have become feasible. Indeed, applications provided by data centers, data warehouses, data workstations have become common features in modern personal and work environments. Such systems execute a wide variety of applications ranging from enterprise resource management applications to personal productivity tools. Many such applications manage communications. Communication management consume significant resources and performance at a promise of improved user productivity.

Improved communication management techniques are becoming ever more important as communication complexity increases across the computer industry. Variety of techniques are necessary to process a communication, to present the communication, and to maintain the communication. There are currently significant gaps when providing print functionality when presenting a content of a communication and associated attachments. Lack of relevant print methods lead to poor management of communications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to content and attachment printing for a communication. A productivity application, according to embodiments, may initiate operations to provide content and attachment printing for a communication upon detecting an intent of a recipient to execute a print operation associated with the communication. Next, a content of the communication or attachment(s) associated with the communication may be identified. A print menu may also be provided. The print menu may include options for the print operation while displaying the content and representations of the attachment(s) together. In response to detecting a hover action on the print menu, an option for the print operation may be highlighted. The option may be associated with the content of the communication and/or attachment(s) associated with the communication. Upon receiving a selection of the option for the print operation, the print operation may be performed without downloading the attachment(s) to a local storage.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
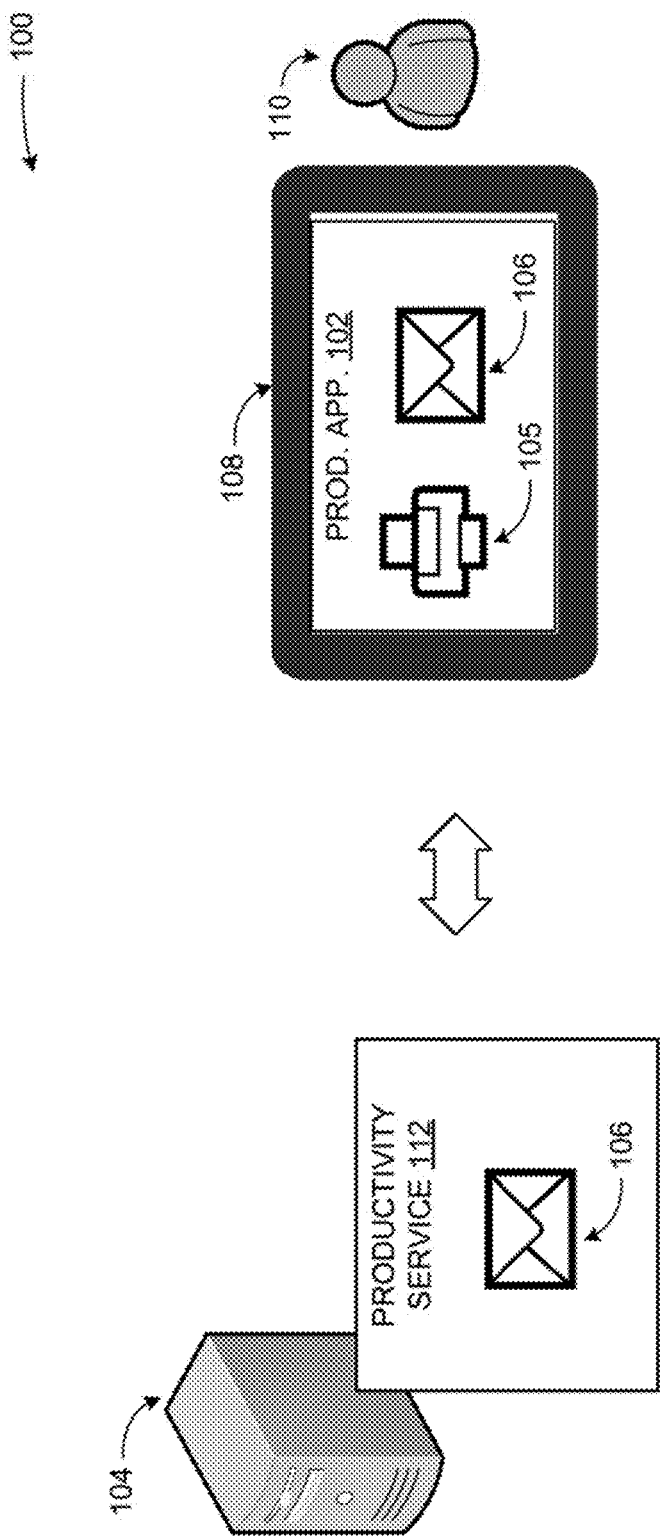
FIG. 1 is a conceptual diagram illustrating examples of providing content and attachment printing for a communication, according to embodiments.

As briefly described above, a productivity application may provide content and attachment printing for a communication. In an example scenario, an intent of a recipient to execute a print operation associated with the communication may be detected. An example of a communication may include an email. The intent may be inferred based on a hover action detected in proximity to a print element associated with the print operation. Next, a content of the communication or attachment(s) associated with the communication may be identified.

Furthermore, a print menu may be provided. The print menu may provide options for the print operation while displaying the content and representations of the attachment(s) together. In response to detecting a hover action on the print menu, an option for the print operation may be highlighted. The option may be associated with the content of the communication and/or attachment(s) associated with the communication. Upon receiving a selection of the option for the print operation, the print operation may be performed without downloading the attachment(s) to a local storage.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide content and attachment printing for a communication. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display, a non-visual display (for impaired users as an example), and/or other user experience associated with an application or service through which a user interacts with the application or service. A user action refers to an interaction between a user and a user experience of an application or a user experience provided by a service that includes touch input, gesture input, voice command, eye tracking, gyroscopic input, pen input, mouse input, and/or keyboards input, among others. An application programming interface (API) may be a set of routines, protocols, and tools for an application or service that enable the application or service to interact or communicate with one or more other applications and services managed by separate entities.

FIG. 1 is a conceptual diagram illustrating examples of providing content and attachment printing for a communication, according to embodiments.

In a diagram 100, a computing device 108 may execute a productivity application 102. An example of the computing device 108 may include a mobile computing device such as a smart phone, a tablet, and/or a mobile computer. The computing device 108 may also include stationary device such as a desktop computer, and/or a workstation computer, among others. The productivity application 102 may include an email client, a browser, and/or similar ones.

Alternatively, an example of the computing device 108 may include a physical server providing service(s) and/or application(s) to client devices. A service may include an application performing operations in relation to a client application and/or a subscriber, among others. An example of the physical server may include and/or is part of a workstation computer, a data warehouse, a data center, and/or a cloud based distributed computing source, among others.

In an example scenario, the computing device 108 may execute the productivity application 102. The computing device 108 may initiate operations to provide content and attachment(s) printing for a communication 106 upon detecting an intent of a recipient 110 to execute a print operation 105 associated with the communication 106. An example of the communication 106 may include an email. The intent may be detected based on an analysis of input action(s) associated with the recipient 110 while the recipient 110 interacts with a user interface of the productivity application 102.

A print element associated with the print operation 105 may be presented on the user interface. A hover action in proximity to the print element may be interpreted as the intent of the recipient 110 to execute the print operation 105. An activation of the print element may also be interpreted as an intent of the recipient 110 to execute the print operation 105. In response to the detected intent, the communication 106 may be processed to identify a content of the communication 106 and/or attachment(s) associated with the communication 106.

Next, a print menu may be provided on the user interface. The print menu may provide option(s) for the print operation 105 while displaying the content and representations of the attachment(s) together. The option(s) may also be referred to as additional print element(s) provided on the print menu to execute the print operation 105. The print operation 105 may print the content of the communication 106 and/or the attachment(s) associated with the communication 106.

In response to detecting a hover action on the print menu, an option for the print operation 105 may be highlighted. The option may be associated with the content of the communication 106 and/or attachment(s) associated with the communication 106. Upon receiving a selection of the option for the print operation 105, the print operation 105 may be performed without downloading the attachment(s) to a local storage.

The computing device 108 may communicate with a productivity server 104 through a network. The productivity server 104 may host a productivity service 112 that may manage a transmission of the communication 106. The network may provide wired or wireless communications between network nodes such as the productivity server 104 and/or the computing device 108, among others. Previous example(s) to provide content and attachment(s) printing for the communication 106 are not provided in a limiting sense. Alternatively, the productivity application 102 may be provided as a client interface of the productivity service 112.

The recipient 110 may interact with the productivity application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 108, the productivity application 102, embodiments are not limited to these components or system configurations and can be implemented with other system configuration employing fewer or additional components.

Figure 2:
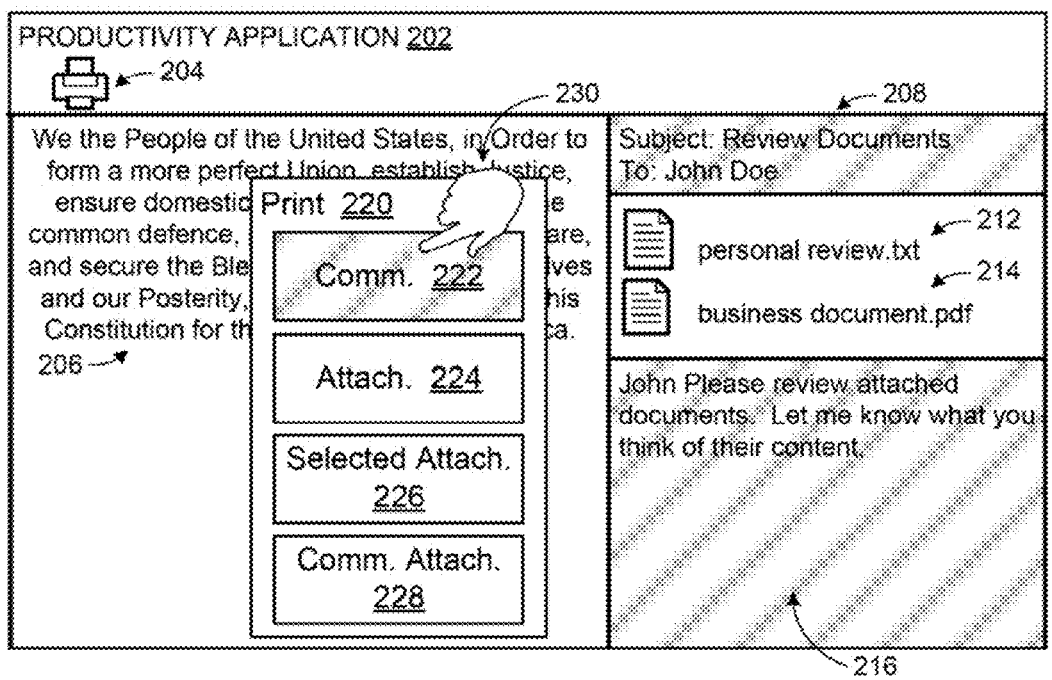
FIG. 2 is a display diagram illustrating an example of printing content of a communication, according to embodiments.
Figure 2:

FIG. 2 is a display diagram illustrating an example of printing content of a communication, according to embodiments.

In a diagram 200, a rendering engine of a productivity application 202 may provide a print element 204 in a user interface of the productivity application 202. The print element 204 may be associated with a print operation for printing a content 216 of the communication 208. An example of the communication 208 may include an email. The content 216 of the communication 208 may include a body of the communication 208 and a header of the communication 208. The header of the communication 208 may identify a sender and/or a recipient of the communication 208. The header of the communication 208 may also include a subject of the communication 208.

Furthermore, the print operation may be executed to print the attachments (212 and 214) associated with the communication 208. The attachments (212 and 214) may include documents. A content 206 of the attachments (212 and 214) may be presented as a preview upon detecting an interaction from a recipient 210 to do as such.

A print menu 220 may be displayed in response to detecting an intent of the recipient 210 to print the content 216 of the communication 208 and/or the attachments (212 and 214) associated with the communication 208. The intent of the recipient 210 may be interpreted upon detecting an interaction with a print element 204 associated with the print operation. An example of the intent may include a detected hover action in proximity to the print element 204. Another example of the intent may include an activation of the print element 204.

Furthermore, the print menu 220 may include options (222, 224, 226, and 228) associated with the print operation. The option 222 may include a print element with operations for printing the content 216 of the communication 208. The option 224 may include a print element with operations for printing the attachments (212 and 214). The option 226 may include a print element with operations for printing a selection from the attachments (212 and 214). The selection may be provided by the recipient 210. The option 228 may include a print element with operations for printing the content 216 of the communication 208 and the attachments (212 and 214).

In an example scenario, a hover action 230 may be detected on the option 222. In response, the option 222 may be highlighted. The productivity application 202 may also highlight the content 216 of the communication 208 which may include the header section and the body section of the communication 208. In response to detecting an activation of the option 222, the print operation may be executed to print the content 216 of the communication 208.

Figure 3:
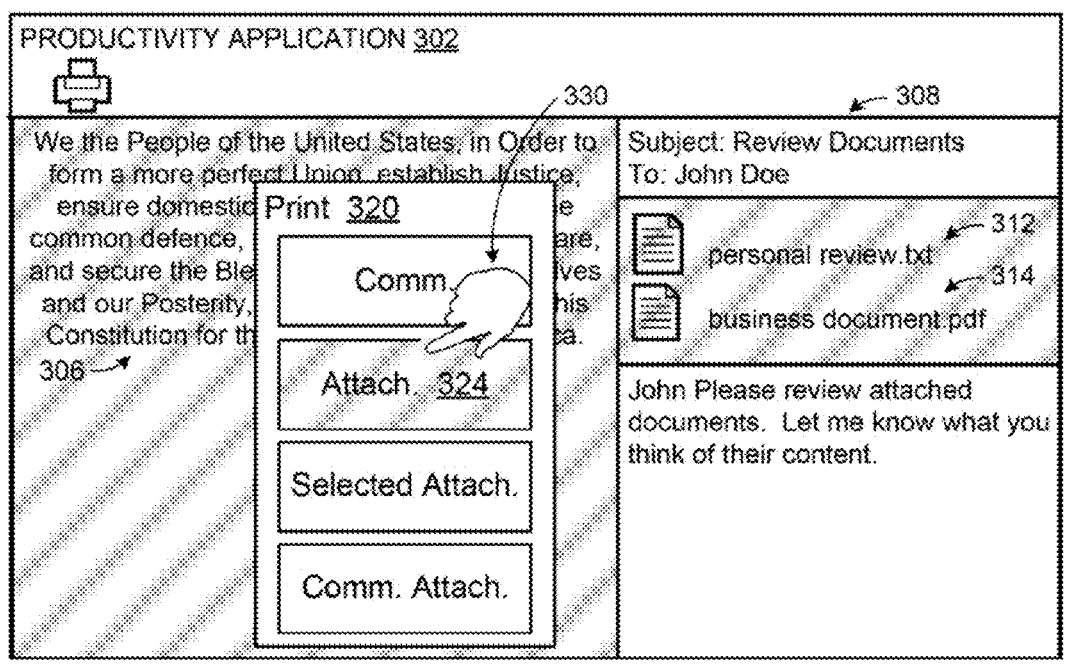
FIG. 3 is a display diagram illustrating an example of printing attachment(s) of a communication, according to embodiments.

FIG. 3 is a display diagram illustrating an example of printing attachment(s) of a communication, according to embodiments.

In a diagram 300, a rendering engine of a productivity application 302 may display a print menu 320 in response to a detected intention of a recipient 310 to print the content of the communication 308 and/or attachments (312 and 314) associated with the communication 308. The print menu 320 may include options with operations to print the content and/or attachments (312 and 314). An example of the options may include an option 324 with operations to print the attachments (312 and 314) associated with the communication 308.

In an example scenario, the rendering engine of the productivity application 302 may detect a hover action 330 on the option 324. In response, the attachments (312 and 314) may be highlighted. The attachments (312 and 314) may be highlighted to inform the recipient 310 that the attachments (312 and 314) are selected for the print operation. The rendering engine may also highlight a content 306 of an attachment (312 or 314). The content 306 may be highlighted to inform the recipient 310 that the attachments (312 and 314) are selected for the print operation. In response to detecting an activation of the option 324, the print operation is executed to print the attachments (312 and 314).

Figure 4:
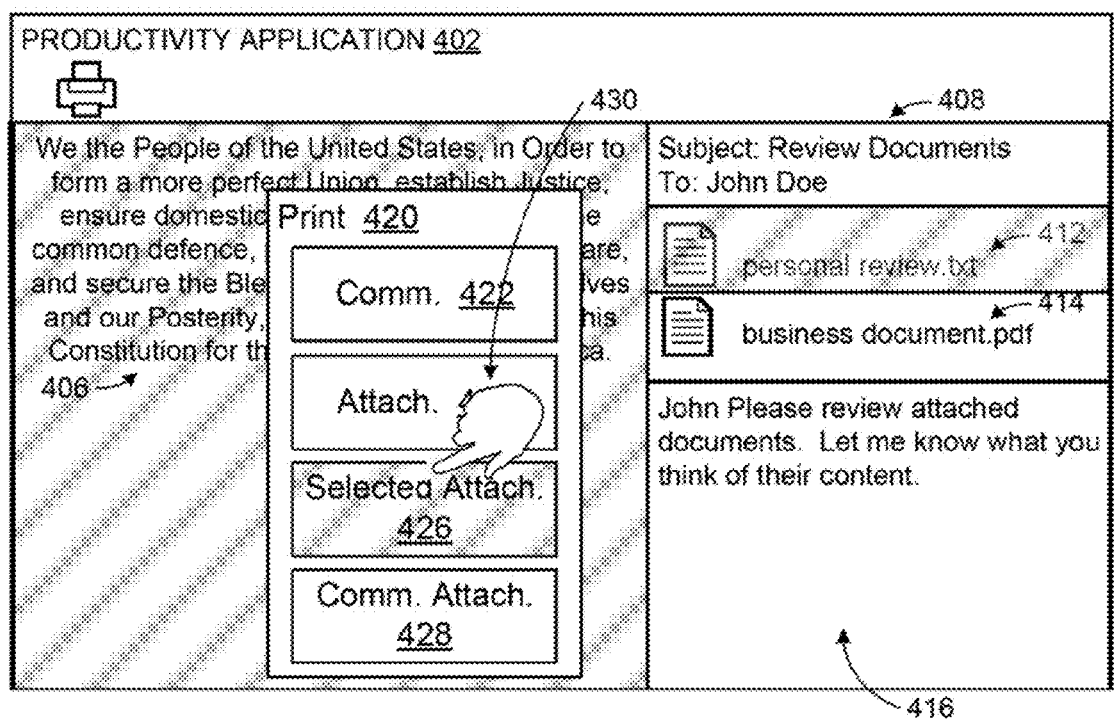
FIG. 4 is a display diagram illustrating an example of printing a selection from attachment(s) of a communication, according to embodiments.
Figure 4:
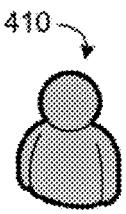

FIG. 4 is a display diagram illustrating an example of printing a selection from attachment(s) of a communication, according to embodiments.

In a diagram 400, a rendering engine of a productivity application 402 may display a print menu 420 in response to a detected intention of a recipient 410 to print the content of the communication 408 and/or attachments (412 and 414) associated with the communication 408. The print menu 420 may include options with operations to print the content and/or attachments (412 and 414). An example of the options may include an option 426 with operations to print a selection of the attachments (412 and 414) associated with the communication 408. The selection may be detected upon an interaction by the recipient 410 marking the attachment 412 (or the attachment 414) for the print operation.

In an example scenario, the rendering engine of the productivity application 402 may detect a hover action 430 on the option 426. In response, the attachment 412 may be highlighted. The attachment 412 may be highlighted to inform the recipient 410 that the attachment 412 is selected for the print operation. The rendering engine may also highlight a content 406 of the attachment 412. The content 406 may be highlighted to inform the recipient 410 that the attachment 412 is selected for the print operation. In response to detecting an activation of the option 426, the print operation may be executed to print the attachment 412.

Figure 5:
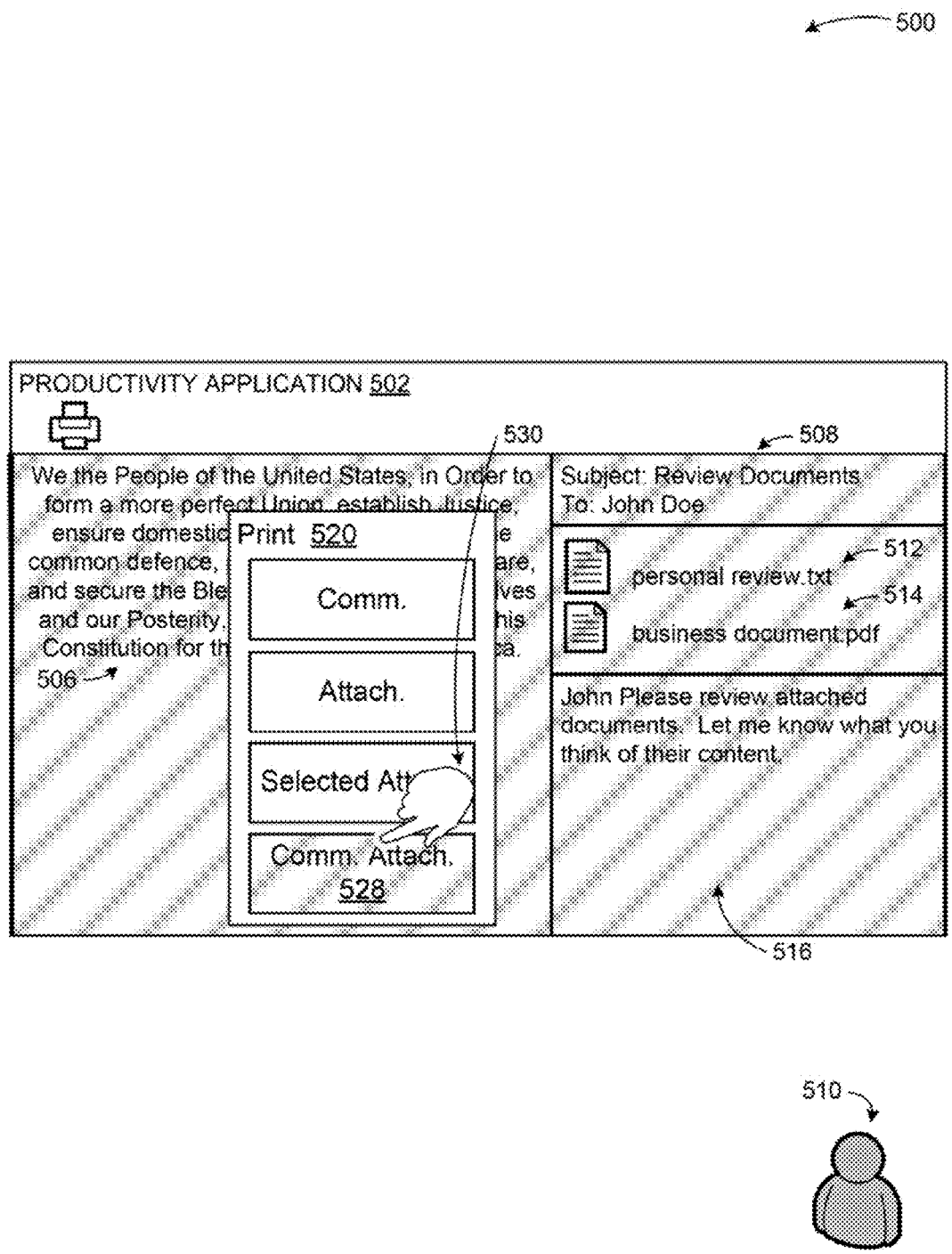
FIG. 5 is a display diagram illustrating an example of printing content and attachment(s) of a communication, according to embodiments.

FIG. 5 is a display diagram illustrating an example of printing content and attachment(s) of a communication, according to embodiments.

In a diagram 500, a rendering engine of a productivity application 502 may display a print menu 520 in response to a detected intention of a recipient 510 to print a content 516 of the communication 508 and/or attachments (512 and 514) associated with the communication 508. The print menu 520 may include options with operations to print the content 516 and/or attachments (512 and 514). An example of the options may include an option 528 with operations to print the content 516 of the communication 508 and the attachments (512 and 514) associated with the communication 508.

In an example scenario, the rendering engine of the productivity application 502 may detect a hover action 530 on the option 528. In response, the content 516 of the communication 508 and the attachments (512 and 514) may be highlighted. The content 516 and the attachments (512 and 514) may be highlighted to inform the recipient 510 that the content 516 and the attachments (512 and 514) are selected for the print operation. The rendering engine may also highlight a content 506 of an attachment (512 or 514). The content 506 may be highlighted to inform the recipient 510 that the attachments (512 and 514) are selected for the print operation. In response detecting an activation of the option 528, the print operation may be executed to print the content 506 and the attachments (512 and 514).

In an example scenario, the attachments (512 and 514) may be ordered for the print operation in an order that includes a top to bottom ranking, a size based ranking, and/or a page based ranking, among others. The top to bottom ranking may order the attachments (512 and 514) based on a presentation order (for example, attachment 512 first and attachment 512 second). Alternatively, the top to bottom ranking may be reversed.

A size based ranking may order the attachments based on a file size of the attachments (512 and 514). For example, the attachment 514 may be printed first if the attachment 514 has a file size larger than the attachment 512. Alternatively, the size based ranking may be reversed to print an attachment with a smaller file size first.

The page based ranking may order the attachments (512 and 514) based on a page number of the attachments (512 and 514). For example, the attachment 514 may be printed first if the attachment 514 has more pages than the attachment 512. Alternatively, the page based ranking may be reversed to print an attachment with fewer page numbers first.

In another example scenario, the attachment 512 may be detected to exceed a page number threshold. The page number threshold may be determined by the recipient 510 or based on a system limitation such as a printer capacity. Upon the attachment 512 exceeding the page number threshold, the recipient 510 may be notified to confirm the print operation for the attachment 512. The print operation for the attachment 512 may be confirmed or cancelled based on a response by the recipient 510.

In another example scenario, page(s) of the attachments (512 and 514) may be configured in an arrangement that includes a collated arrangement, a non-collated arrangement, and/or a side by side arrangement, among others. In a side by side arrangement, the print operation may be configured to print corresponding pages with a matching page number from the attachments (512 and 514) side by side in a single page at the printer. The side by side arrangement may be subject to font size limitations. If the font size is determined to lack optimum readability, then side by side printing may not be made available as an arrangement option.

As discussed above, the productivity application may be employed to perform operations to provide content and attachment printing for a communication. An increased user efficiency with the client interfaces of the productivity application 102 may occur as a result of automatically highlighting content and/or attachment(s) associated with a selected print option provided in a print menu. A print menu with print options also automates providing print operations while viewing content of the communication along with the attachments. Additionally, providing content and attachment printing for the communication, by the productivity application 102, may reduce processor load, increase processing speed, conserve memory, reduce network bandwidth usage, and/or similar ones.

Embodiments, as described herein, address a need that arises from a lack of efficiency to provide content and attachment printing for a communication. The actions/operations described herein are not a mere use of a computer, but address results that are a direct consequence of software used as a service offered to large numbers of users and applications.

The example scenarios and schemas in FIG. 1 through 5 are shown with specific components, data types, and configurations. Embodiments are not limited to systems according to these example configurations. Providing content and attachment printing for a communication may be implemented in configurations employing fewer or additional components in applications and user interfaces. Furthermore, the example schema and components shown in FIG. 1 through 5 and their subcomponents may be implemented in a similar manner with other values using the principles described herein.

Figure 6:
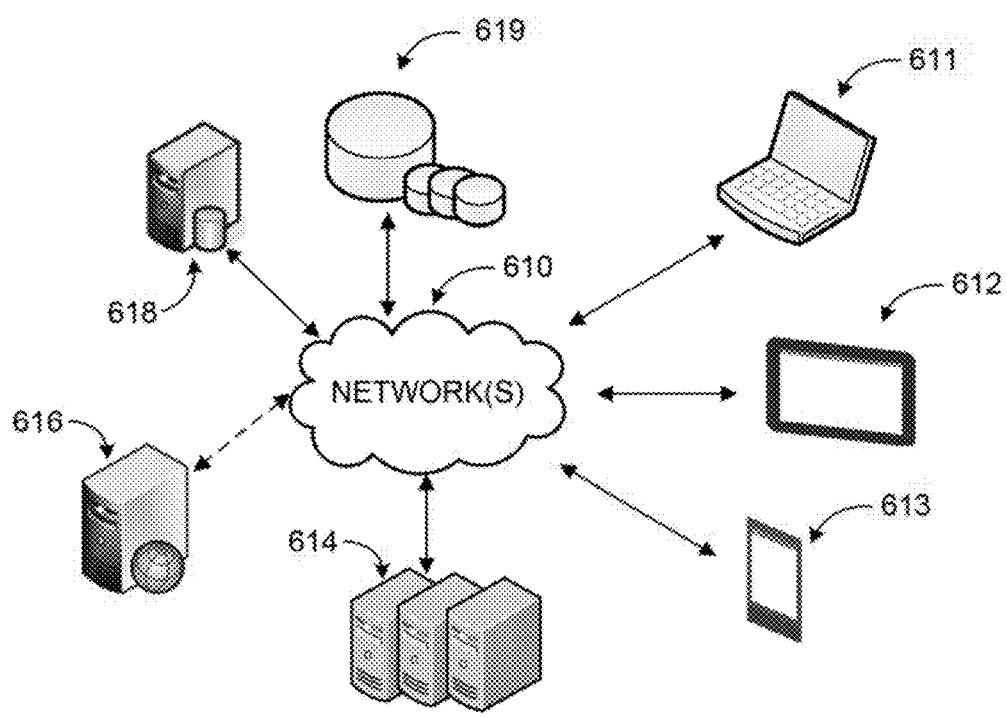
FIG. 6 is a simplified networked environment, where a system according to embodiments may be implemented.

FIG. 6 is an example networked environment, where embodiments may be implemented. A productivity application configured to provide content and attachment printing for a communication may be implemented via software executed over one or more servers 614 such as a hosted service. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. A productivity application may detect an intent of a recipient to execute a print operation associated with the communication. Next, a content of the communication or attachment(s) associated with the communication may be identified. A print menu may also be provided. The print menu may include options for the print operation while displaying the content and representations of the attachment(s) together. In response to detecting a hover action on the print menu, an option for the print operation may be highlighted. The option may be associated with the content of the communication and/or attachment(s) associated with the communication. Upon receiving a selection of the option for the print operation, the print operation may be performed without downloading the attachment(s) to a local storage. The productivity application may store data associated with the communication in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide content and attachment printing for a communication. Furthermore, the networked environments discussed in FIG. 6 are for illustration purposes only. Embodiments are not limited to the example applications, modules, or processes.

Figure 7:
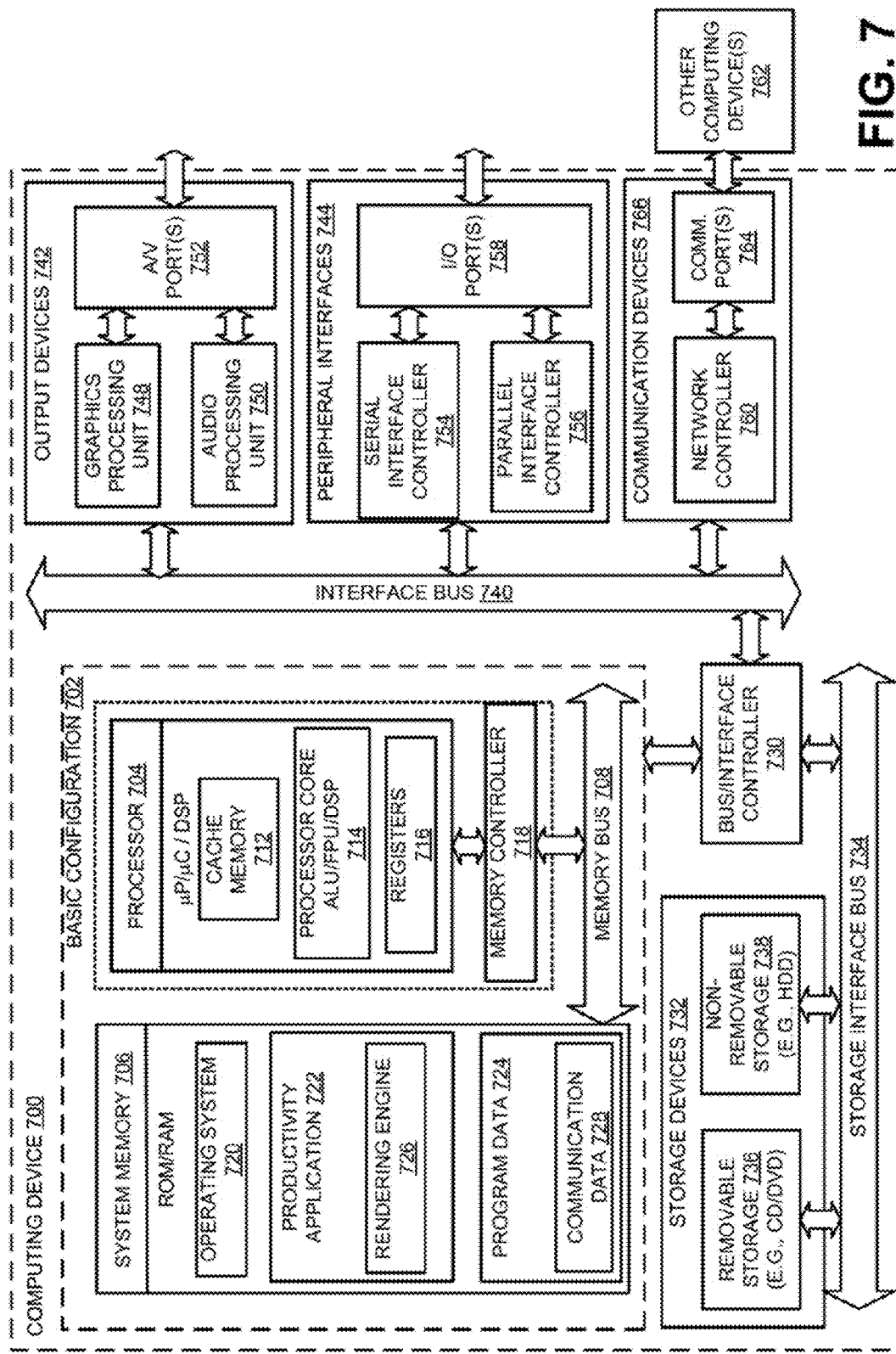
FIG. 7 is a block diagram of an example computing device, which may be used to provide content and attachment printing for a communication, according to embodiments.

FIG. 7 is a block diagram of an example computing device, which may be used to provide content and attachment printing for a communication, according to embodiments.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a productivity application 722, and a program data 724. The productivity application 722 may include a component such as a rendering engine 726. The rendering engine 726 may execute the processes associated with the productivity application 722. The rendering engine 726 may detect an intent of a recipient to execute a print operation associated with the communication. Next, a content of the communication or attachment(s) associated with the communication may be identified. A print menu may also be provided. The print menu may include options for the print operation while displaying the content and representations of the attachment(s) together. In response to detecting a hover action on the print menu, an option for the print operation may be highlighted. The option may be associated with the content of the communication and/or attachment(s) associated with the communication. Upon receiving a selection of the option for the print operation, the print operation may be performed without downloading the attachment(s) to a local storage.

Input to and output out of the productivity application 722 may be transmitted through a communication module associated with the computing device 700. An example of the communication module may include a communication device 766 that may be communicatively coupled to the computing device 700. The communication module may provide wired and/or wireless communication. The program data 724 may also include, among other data, communication data 728, or the like, as described herein. The communication data 728 may include a content, and/or an attachment, among others.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example of the communication device(s) 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations. Additionally, the computing device 700 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide content and attachment printing for a communication. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
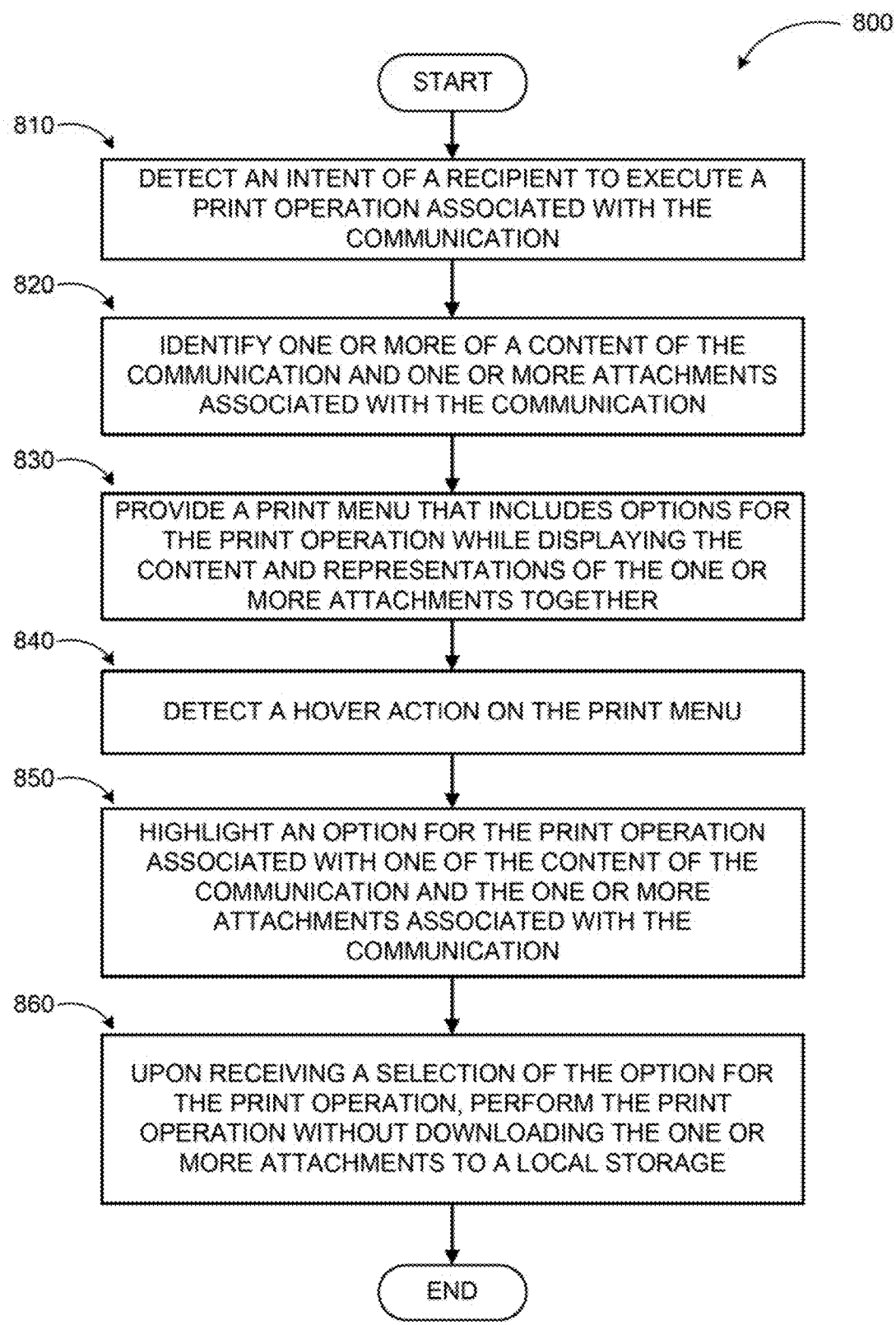
FIG. 8 is a logic flow diagram illustrating a process for providing content and attachment printing for a communication, according to embodiments.

FIG. 8 is a logic flow diagram illustrating a process for providing content and attachment printing for a communication, according to embodiments. Process 800 may be implemented on a computing device, such as the computing device 700 or another system.

Process 800 begins with operation 810, where the productivity application may detect an intent of a recipient to execute a print operation associated with the communication. At operation 820, content of the communication and/or attachment(s) associated with the communication are identified. A print menu that includes options for the print operation is provided while displaying the content and/or representations of the attachment(s) together at operation 830.

A hover action on the print menu is detected at operation 840. The hover action may be detected on an option to print the content and/or the attachment(s). At operation 850, the option for the print operation is highlighted. The option may be associated with the content and/or the attachment(s). At operation 860, upon receiving a selection of the option for the print operation, the print operation is performed without downloading the attachment(s) to a local storage.

The operations included in process 800 are for illustration purposes. Providing content and attachment printing for a communication may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing content and attachment printing for a communication is described. The means may include a means for detecting an intent of a recipient to execute a print operation associated with an email; a means for identifying one or more of a content of the email and one or more attachments associated with the email; a means for providing a print menu that includes options for the print operation while displaying the content and representations of the one or more attachments together; a means for detecting a hover action on the print menu; a means for highlighting an option for the print operation associated with one of the content of the email and the one or more attachments associated with the email; a means for highlighting one of the content of the email and the one or more attachments associated with the email, where the one of the content of the email and the one or more attachments associated with the email is associated with the option that is highlighted; and a means for upon receiving a selection of the option for the print operation performing the print operation without downloading the one or more attachments to a local storage.

According to some examples, a computing device to provide content and attachment printing for a communication is described. The computing device may include a communication module configured to facilitate exchange of information associated with the communication and other data with computing devices; a memory configured to store instructions associated with a productivity application; a processor coupled to the memory and the communication module, the processor executing the productivity application in conjunction with the instructions stored in the memory. The productivity application may include a rendering engine configured to detect an intent of a recipient to execute a print operation associated with the communication; identify one or more of a content of the communication and one or more attachments associated with the communication; provide a print menu that includes options for the print operation while displaying the content and representations of the one or more attachments together; detect a hover action on the print menu; highlight an option for the print operation associated with one of the content of the communication and the one or more attachments associated with the communication; and upon receiving a selection of the option for the print operation, perform the print operation without downloading the one or more attachments to a local storage.

According to other examples, the rendering engine may be configured to detect the intent of the recipient further by performing one or more operations including detect an activation of a print element presented in relation to one or more of the content of the communication and one or more attachments associated with the communication. The rendering engine may be further configured to detect an extended presence of an input element in proximity to a print element presented in relation to one or more of the content of the communication and one or more attachments associated with the communication. The extended presence may exceed a duration threshold. The rendering engine may also be configured to present a print element with one or more operations for printing the content of the communication as the option. The rendering engine may be further configured to present a print element with one or more operations to print the content of the communication and the one or more attachments associated with the communication; and emphasize the content of the communication and the one or more attachments associated with the communication selected for printing by highlighting the content of the communication and the one or more attachments associated with the communication.

According to further examples, the rendering engine may be further configured to emphasize the content of the communication selected for printing by highlighting the content of the communication, present a print element with one or more operations for printing the one or more attachments as the option, and emphasize the one or more attachments associated with the communication selected for printing by highlighting the one or more attachments associated with the communication. The rendering engine may also be configured to detect another selection of a subset of the one or more attachments; and present a print element with one or more operations to print the subset of the one or more attachments. The rendering engine may be further configured to emphasize the subset of the one or more attachments associated with the communication selected for printing by highlighting the subset of the one or more attachments associated with the communication.

According to other examples, a method executed on a computing device to provide content and attachment printing for a communication is described. The method may include detecting an intent of a recipient to execute a print operation associated with an email; identifying one or more of a content of the email and one or more attachments associated with the email; providing a print menu that includes options for the print operation while displaying the content and representations of the one or more attachments together; detecting a hover action on the print menu; highlighting an option for the print operation associated with one of the content of the email and the one or more attachments associated with the email; highlighting one of the content of the email and the one or more attachments associated with the email, where the one of the content of the email and the one or more attachments associated with the email is associated with the option that is highlighted; and upon receiving a selection of the option for the print operation, performing the print operation without downloading the one or more attachments to a local storage.

According to some examples, the method may further include presenting a print element for printing the one or more attachments associated with the email as the option; detecting an activation of the print element; and executing the print operation for printing each of the one or more attachments associated with the email. The method may also include ordering the one or more attachments for the print operation in an order that includes one or more of: a top to bottom ranking that orders the one or more attachments based on a presentation order of the one or more attachments, a size based ranking that orders the one or more attachments based on a file size of each of the one or more attachments, and a page based ranking that orders the one or more attachments based on a page number of each of the one or more attachments.

According to other examples, the method may also include detecting a subset of the one or more attachments exceed a page number threshold; and notifying the recipient to confirm the print operation for the subset of the one or more attachments. The method may further include presenting the print menu while providing a preview of the one or more attachments associated with the email, and configuring the print operation by placing a page of each of the one or more attachments in an arrangement that includes one or more of: a collated arrangement, a non-collated arrangement, and a side by side arrangement, where multiple pages from the one or more attachments are printed as a single page.

According to further examples, a computer-readable memory device with instructions stored thereon to automatically update a calendar event is described. The instructions may include detecting an intent of a recipient to execute a print operation associated with an email; identifying one or more of a content of the email and one or more attachments associated with the email; providing a print menu that includes options for the print operation while displaying the content and representations of the one or more attachments together; detecting a hover action on the print menu; highlighting an option for the print operation associated with one of the content of the email and the one or more attachments associated with the email; highlighting one of the content of the email and the one or more attachments associated with the email, where the one of the content of the email and the one or more attachments associated with the email is associated with the option that is highlighted; and upon receiving a selection of the option for the print operation, performing the print operation without downloading the one or more attachments to a local storage.

According to some examples, the instructions may further include detecting an extended presence of an input element in proximity to a print element presented in relation to one or more of the content of the email and one or more attachments associated with the email, where the extended presence exceeds a duration threshold. The instructions may also include presenting a print element for printing the one or more attachments associated with the email as the option; detecting an activation of the print element; executing the print operation for printing each of the one or more attachments associated with the email; and ordering the one or more attachments for the print operation in an order that includes one or more of: a top to bottom ranking that orders the one or more attachments based on a presentation order of the one or more attachments, a size based ranking that orders the one or more attachments based on a file size of each of the one or more attachments, and a page based ranking that orders the one or more attachments based on a page number of each of the one or more attachments.

According to some examples, a means for providing content and attachment printing for a communication is described. The means for providing content and attachment printing for a communication includes a means for detecting an intent of a recipient to execute a print operation associated with the communication, a means for identifying one or more of a content of the communication and one or more attachments associated with the communication, a means for providing a print menu that includes options for the print operation while displaying the content and representations of the one or more attachments together, a means for detecting a hover action on the print menu, a means for highlighting an option for the print operation associated with one of the content of the communication and the one or more attachments associated with the communication, and a means for upon receiving a selection of the option for the print operation, perform the print operation without downloading the one or more attachments to a local storage.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide content and attachment printing for a communication, the computing device comprising:
   a communication device configured to facilitate exchange of information associated with the communication and data with computing devices;
   a memory configured to store instructions;
   a processor coupled to the memory and the communication device, wherein the processor, in conjunction with the instructions stored in the memory, is configured to:
      detect an intent of a recipient to execute a print operation associated with the communication;

identify one or more of a content of the communication and one or more attachments associated with the communication;

provide a print menu that includes options for the print operation while displaying the content and representations of the one or more attachments together;

detect a hover action on the print menu;

highlight an option for the print operation associated with one of the content of the communication and the one or more attachments associated with the communication; and upon receiving a selection of the option for the print operation, perform the print operation without downloading the one or more attachments to a local storage;

detect another selection of a subset of the one or more attachments; and present a print element with one or more operations to print the subset of the one or more attachments.

2. The computing device of claim 1, wherein the processor is configured to detect the intent of the recipient further by performing one or more operations including:

detect an activation of a print element presented in relation to one or more of the content of the communication and one or more attachments associated with the communication.

3. The computing device of claim 1, wherein the processor is further configured to:

detect an extended presence of an input element in proximity to a print element presented in relation to one or more of the content of the communication and one or more attachments associated with the communication.

4. The computing device of claim 3, wherein the extended presence exceeds a duration threshold.

5. The computing device of claim 1, wherein the processor is further configured to:

present a print element with one or more operations for printing the content of the communication as the option.

6. The computing device of claim 5, wherein the processor is further configured to:

emphasize the content of the communication selected for printing by highlighting the content of the communication.

7. The computing device of claim 1, wherein the processor is further configured to:

present a print element with one or more operations for printing the one or more attachments as the option.

8. The computing device of claim 7, wherein the processor is further configured to:

emphasize the one or more attachments associated with the communication selected for printing by highlighting the one or more attachments associated with the communication.

9. The computing device of claim 1, wherein the processor is further configured to:

emphasize the subset of the one or more attachments associated with the communication selected for printing by highlighting the subset of the one or more attachments associated with the communication.

10. The computing device of claim 1, wherein the processor is further configured to:

present a print element with one or more operations to print the content of the communication and the one or more attachments associated with the communication; and emphasize the content of the communication and the one or more attachments associated with the communication selected for printing by highlighting the content of the communication and the one or more attachments associated with the communication.

11. A method executed on a computing device to provide content and attachment printing for a communication, the method comprising:

detecting an intent of a recipient to execute a print operation associated with an email;

identifying one or more of a content of the email and one or more attachments associated with the email;

providing a print menu that includes options for the print operation while providing a preview of the one or more attachments associated with the email and the content and representations of the one or more attachments together;

detecting a hover action on the print menu;

highlighting an option for the print operation associated with one of the content of the email and the one or more attachments associated with the email;

highlighting one of the content of the email and the one or more attachments associated with the email, wherein the one of the content of the email and the one or more attachments associated with the email is associated with the option that is highlighted; and upon receiving a selection of the option for the print operation, performing the print operation without downloading the one or more attachments to a local storage.

12. The method of claim 11, further comprising:

presenting a print element for printing the one or more attachments associated with the email as the option;

detecting an activation of the print element; and executing the print operation for printing each of the one or more attachments associated with the email.

13. The method of claim 12, further comprising:

ordering the one or more attachments for the print operation in an order that includes one or more of:

a top to bottom ranking that orders the one or more attachments based on a presentation order of the one or more attachments, a size based ranking that orders the one or more attachments based on a file size of each of the one or more attachments, and a page based ranking that orders the one or more attachments based on a page number of each of the one or more attachments.

14. The method of claim 11, further comprising:

detecting a subset of the one or more attachments exceed a page number threshold; and notifying the recipient to confirm the print operation for the subset of the one or more attachments.

15. The method of claim 11, further comprising:

configuring the print operation by placing a page of each of the one or more attachments in an arrangement that includes one or more of:

a collated arrangement, a non-collated arrangement, and a side by side arrangement, wherein multiple pages from the one or more attachments are printed as a single page.

* * * * *